US010872464B2

(12) United States Patent
Parmar et al.

(10) Patent No.: US 10,872,464 B2
(45) Date of Patent: Dec. 22, 2020

(54) ALIGNED AUGMENTED REALITY VIEWS

(71) Applicant: Outward, Inc., San Jose, CA (US)

(72) Inventors: Manu Parmar, Sunnyvale, CA (US); Brook Seaton, Oakland, CA (US); Clarence Chui, Los Altos Hills, CA (US)

(73) Assignee: Outward, Inc., San Jose, CA (US)

( * ) Notice: Subject to any disclaimer, the term of this patent is extended or adjusted under 35 U.S.C. 154(b) by 0 days.

(21) Appl. No.: 16/176,510

(22) Filed: Oct. 31, 2018

(65) Prior Publication Data

US 2019/0130637 A1 May 2, 2019

Related U.S. Application Data (60) Provisional application No. 62/579,790, filed on Oct. 31, 2017.

(51) Int. Cl.
| | |
|---|---|
| *G06T 17/00* | (2006.01) |
| *G06T 7/70* | (2017.01) |
| *G06T 19/00* | (2011.01) |

(52) U.S. Cl.
CPC ............ *G06T 17/00* (2013.01); *G06T 7/70* (2017.01); *G06T 19/006* (2013.01); *G06T 2210/04* (2013.01)

(58) Field of Classification Search
None
See application file for complete search history.

(56) References Cited

U.S. PATENT DOCUMENTS

| | | | |
|---|---|---|---|
| 8,705,893 B1 | 4/2014 | Zhang | |
| 9,025,861 B2 * | 5/2015 | Furukawa | ............... G06T 17/00 382/154 |
| 9,910,937 B2 * | 3/2018 | Patwari | ................... G06F 3/165 |
| 10,467,804 B2 * | 11/2019 | Fleischman | ............... G06T 7/73 |
| 10,586,385 B2 * | 3/2020 | Moghadam | ........... G01S 7/4808 |
| 2002/0107674 A1 * | 8/2002 | Bascle | .................... G06F 3/011 703/1 |
| 2005/0128212 A1 | 6/2005 | Edecker | |

(Continued)

OTHER PUBLICATIONS

S. Golodetz, T. Cavallari, N. A. Lord, V. A. Prisacariu, D. W. Murray and P. H. S. Torr, "Collaborative Large-Scale Dense 3D Reconstruction with Online Inter-Agent Pose Optimisation," in IEEE Transactions on Visualization and Computer Graphics, vol. 24, No. 11, pp. 2895-2905, Nov. 2018. (Year: 2018).*

(Continued)

*Primary Examiner* — James A Thompson
(74) *Attorney, Agent, or Firm* — Van Pelt, Yi & James LLP (57) ABSTRACT

Techniques for generating aligned, augmented reality views are disclosed. In some embodiments, an estimate of a floorplan of a three-dimensional space is first generated based on one or more views of the three-dimensional space from a camera of a device located in the three-dimensional space. A cost function is next minimized with respect to the estimate of the floorplan to generate a corrected floorplan having less error than the estimated floorplan, and a camera pose corresponding to the corrected floorplan is determined. Display of a rendering having the determined camera pose is facilitated in an actual view of the camera, resulting in an aligned, augmented reality view.

54 Claims, 6 Drawing Sheets

(56) References Cited

U.S. PATENT DOCUMENTS

| | | |
|---|---|---|
| 2009/0284549 A1 | 11/2009 | Flynn |
| 2013/0004060 A1 | 1/2013 | Bell |
| 2013/0278635 A1 | 10/2013 | Maggiore |
| 2014/0043436 A1 | 2/2014 | Bell |
| 2014/0301633 A1* | 10/2014 | Furukawa ............... G06T 17/00 382/154 |
| 2015/0347638 A1* | 12/2015 | Patwari .................. G01S 15/89 703/1 |
| 2017/0214899 A1 | 7/2017 | Meier |
| 2018/0075648 A1* | 3/2018 | Moghadam ............. G06T 19/20 |
| 2019/0005719 A1* | 1/2019 | Fleischman .......... H04N 13/204 |
| 2019/0155302 A1* | 5/2019 | Lukierski ................ G06T 17/00 |

OTHER PUBLICATIONS

H. Chu, D. K. Kim and T. Chen, "You are Here: Mimicking the Human Thinking Process in Reading Floor-Plans," 2015 IEEE International Conference on Computer Vision (ICCV), Santiago, 2015, pp. 2210-2218. (Year: 2015).*

* cited by examiner

ALIGNED AUGMENTED REALITY VIEWS

CROSS REFERENCE TO OTHER APPLICATIONS

This application claims priority to U.S. Provisional Patent Application No. 62/579,790 entitled CLOSING THE LOCALIZATION LOOP IN AR FOR FLOORPLANS filed Oct. 31, 2017 which is incorporated herein by reference for all purposes.

BACKGROUND OF THE INVENTION

Existing augmented reality (AR) applications in which renderings are overlaid on real time camera views typically suffer from alignment issues due to errors in estimates of camera pose in unknown three-dimensional spaces. Thus, techniques that result in more accurate alignment are needed and disclosed herein.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

In augmented reality (AR) applications, a rendering is displayed on top of an actual camera view of a physical environment to provide a blended or mixed reality experience. For example, a rendering may be overlaid or superimposed on a real time camera view to generate a composite view that is a different or more enhanced version of an actual view or scene seen by the camera. In such applications, correct or proper placement of rendered objects in camera views relies on accurate estimates of camera pose in three-dimensional space.

Mobile devices that support augmented reality applications, however, have not yet evolved in terms of sensors and processing power to provide sufficiently accurate estimates of camera pose, especially in real time, resulting in less than ideal AR experiences in many cases. Specifically, drift in mobile device sensors (e.g., over time, with movement, across large spaces) produces cumulative error or noise in camera pose estimates, which surfaces as inconsistencies, mismatches, and/or misalignments in generated composite views.

Techniques for correcting errors in camera pose estimates based on foreknowledge of the physical environment are disclosed herein. The disclosed techniques facilitate substantially accurate alignment in composite views and, thus, result in well registered augmented reality experiences.

The disclosed techniques may be employed with respect to an augmented reality application that, in some embodiments, comprises client-side and server-side components. In some such cases, for example, an actual view comprising a current field of view of a camera of a client device, e.g., in a viewfinder or display associated with the camera, is combined in real time with a rendering provided by a server to generate a composite augmented reality view at the client device, in some cases based on input or interactions from a user of the device. A client-side device may comprise any computing device that is capable of communicating with an associated server, such as a cellular or mobile phone, tablet computer, laptop computer, virtual or augmented reality device or headset, etc. The disclosed techniques, however, are not limited to client-server architectures and generally may be employed with respect to any other appropriate augmented reality application architectures.

In some embodiments, a priori information about the physical environment includes foreknowledge that the physical environment comprises a floorplan. That is, it is known that the physical environment comprises an enclosed, indoors space (e.g., a building or part thereof such as a room) comprising elements including a floor, walls, and corners. Given foreknowledge that a physical environment comprises a floorplan, an estimate of the floorplan of the physical environment is first generated. An example of a technique for estimating a floorplan is next described with respect to FIG. 1A. However, generally, any one or more appropriate techniques may be employed to generate a floorplan estimate of a three-dimensional space, e.g., based on views of the three-dimensional space from a camera of a device located in the three-dimensional space.

Figure 1A:
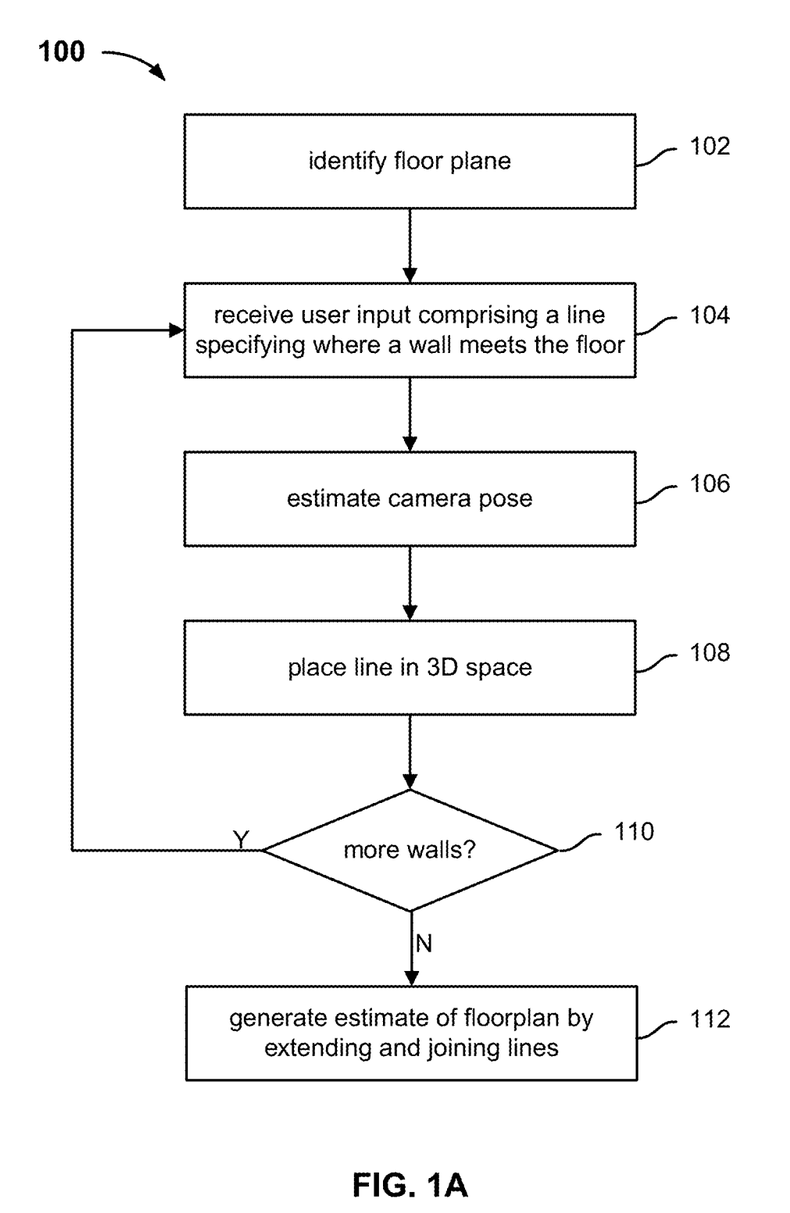
FIG. 1A is a high level flow chart illustrating an embodiment of a process for generating an estimate of a floorplan of a three-dimensional space.

FIG. 1A is a high level flow chart illustrating an embodiment of a process 100 for generating an estimate of a floorplan of a three-dimensional space. At step 102, a floor plane of the floorplan is identified, e.g., using a standard technique such as the methods used by Apple ARkit API or Google Tango API. At step 104, user input comprising a line specifying where a wall meets the floor is received. For example, a user may draw a line on a display of a user device showing a camera view of the three-dimensional space and align the line drawn on the display with where the wall meets the floor in the camera view to generate the user input of step 104. At step 106, camera pose is estimated. Any one or more appropriate techniques may be employed to estimate camera pose at step 106. For example, camera pose may be estimated based on inertial measurements, simultaneous localization and mapping (SLAM), etc. At step 108, the line of step 104 is placed in three-dimensional space at the location of the wall and aligned with the projection of the line on the camera. Step 110 facilitates iteration of steps 104-110 of process 100 for each wall until all walls have been specified by lines. At step 112, an estimate of the floorplan is generated by extending and joining the lines in three-dimensional space that result from step 108.

Figure 1B:
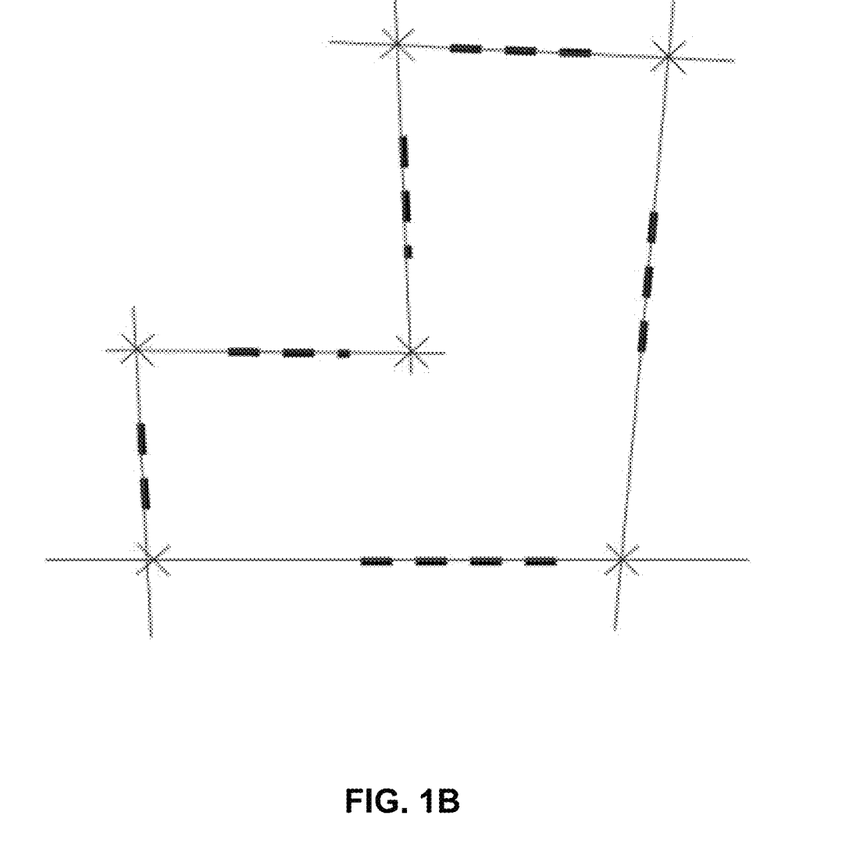
FIG. 1B illustrates an example of an estimate of a floorplan.
Figure 1C:
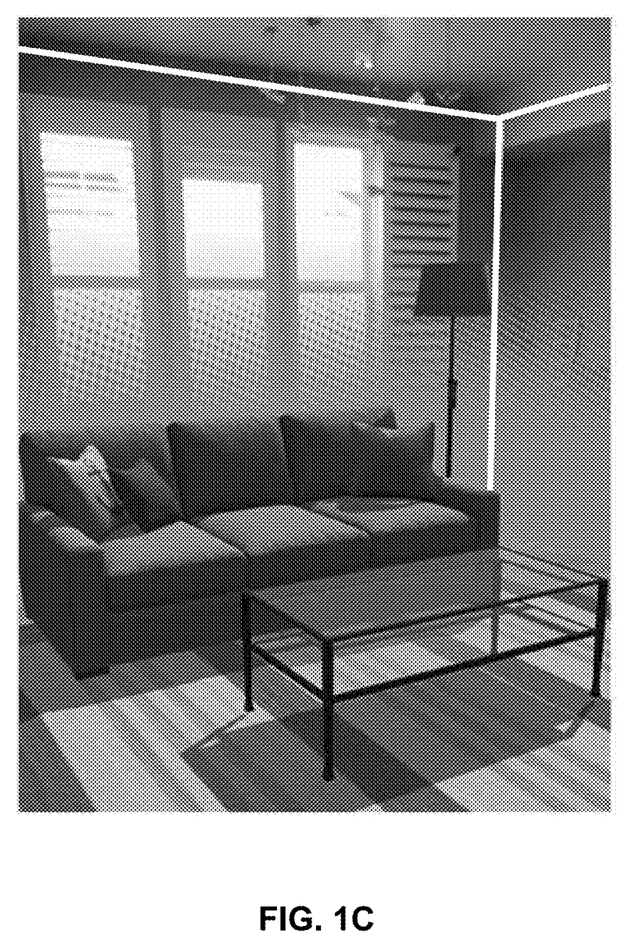
FIG. 1C illustrates an example of a composite image having alignment errors.

FIG. 1B illustrates an example of an estimate of a floorplan generated using process 100 of FIG. 1A. In FIG. 1B, the dashed lines are the lines of step 108, the solid lines comprise extensions of the dashed lines, and the intersections of the extended solid lines (cross marks in the figure) comprise corners of the floorplan. As can be seen in FIG. 1B, distortions exist in the ground plane and walls of the estimate of the floorplan. Errors in the estimate of the floorplan result from errors in the estimates of camera pose at step 106. FIG. 1C illustrates an example of a composite image having alignment errors. In this example, errors in the corresponding floorplan estimate (or equivalently camera pose) result in misalignment between rendered objects (the home furnishings items in the image) and real world features (the floor, walls, and ceiling of the room). The white lines are specifically included in FIG. 1C to illustrate that errors in the floorplan estimate result in mismatched corners and lines, i.e., the walls and ceiling from the floorplan estimate are misaligned with respect to their real world counterparts in the actual camera view of the room.

In some embodiments, errors in floorplan estimates may be corrected based on a priori information about floorplans, such as known information about typical (room) shapes, layouts, and dimensions. In some such cases, a cost or error function may be minimized with respect to an estimate of the floorplan to generate a corrected or revised version of the floorplan that more accurately represents actual pose. Such a cost function may include a set of one or more constraints based on foreknowledge of standard geometries (e.g., angles, heights, etc.) and/or other properties associated with floorplans. An example of a constraint that may be associated with the cost function includes constraining walls to meet at right angles (i.e., angles of ±90°). Such a constraint does not result in the snapping of all walls to right angles (which would create further errors) but rather weights walls that are close to right angles more favorably in the cost function, resulting in walls that should be at right angles to actually be at right angles in the revised version of the floorplan and walls that are actually at other angles (e.g., slanted) to remain that way. In some cases, the floorplan itself is not unknown but rather a precise specification of the floorplan in which the device (camera) is located exists and is known in complete detail. In such cases, the constraints comprise the known specification of the floorplan, and the revised floorplan is constrained to match the known specification.

In various embodiments, any appropriate cost or error functions may be employed. Such cost or error functions, for instance, may depend on variances from standard values expected with respect to floorplans. An example of a cost or error function having the constraint that walls meet at right angles follows as Equation 1.

$$\Phi = \Sigma_{j=1}^{N}(90-\theta_j) \quad \text{(Equation 1)}$$

In Equation 1, N is the number of walls, and $\theta_j$ are the angles between the jth and (j+1)th wall. $\theta_j$ is further specified by Equation 2.

$$\theta_j = f(C_j) \quad \text{(Equation 2)}$$

In Equation 2, $C_j$ are the extrinsic camera matrices for cameras used to mark lines on the camera display that align to walls. $C_j$ is further specified by Equation 3.

$$C_j = \left[\begin{array}{c|c} R_j & t_j \\ \hline 0 & 1 \end{array}\right] \quad \text{(Equation 3)}$$

In Equation 3, $R_j$ are rotation matrices, and $t_j$ are translation vectors.

Figure 2A:
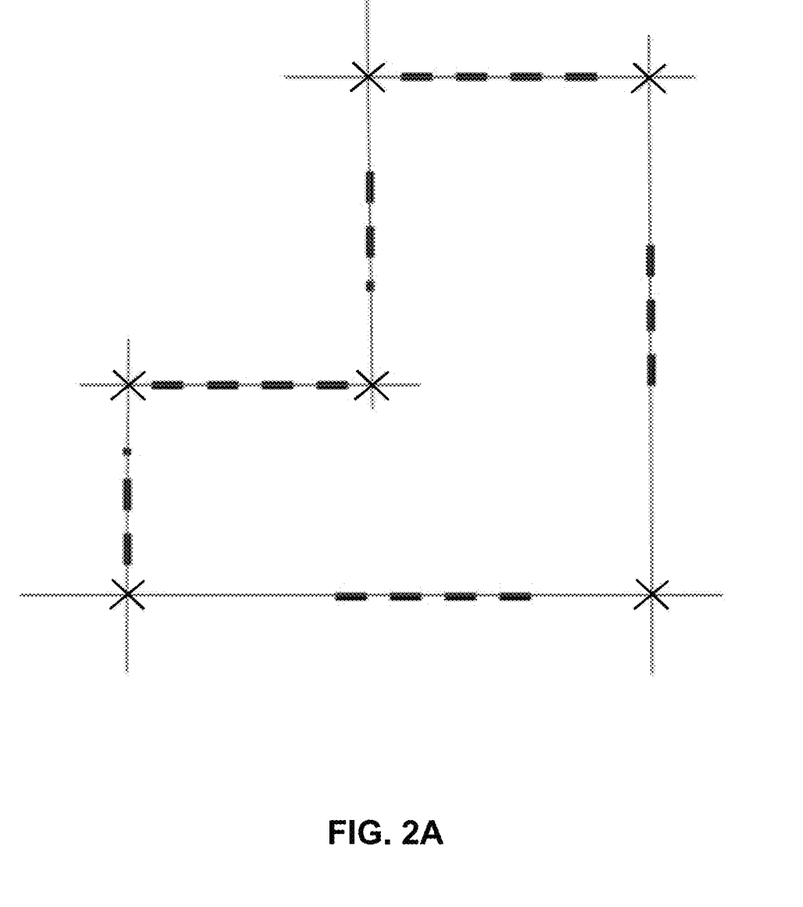
FIG. 2A illustrates an example of a revised or corrected floorplan.
Figure 2B:
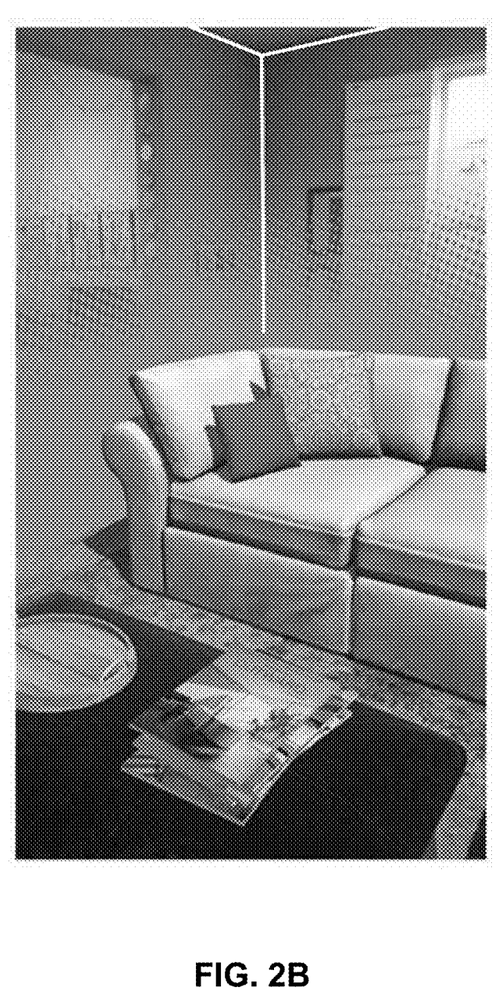
FIG. 2B illustrates an example of an aligned composite image.

FIG. 2A illustrates an example of a revised or corrected floorplan generated by minimizing the cost function of Equation 1 with respect to the floorplan estimate of FIG. 1B. As depicted, the corrected floorplan comprises more accurate angles between walls. FIG. 2B illustrates an example of a composite image resulting from overlaying a rendering having a camera pose corresponding to the corrected floorplan of FIG. 2A with an actual camera view. As depicted, the composite image comprises well aligned corners and lines as highlighted by the white lines in the image from the corrected floorplan.

Figure 3:
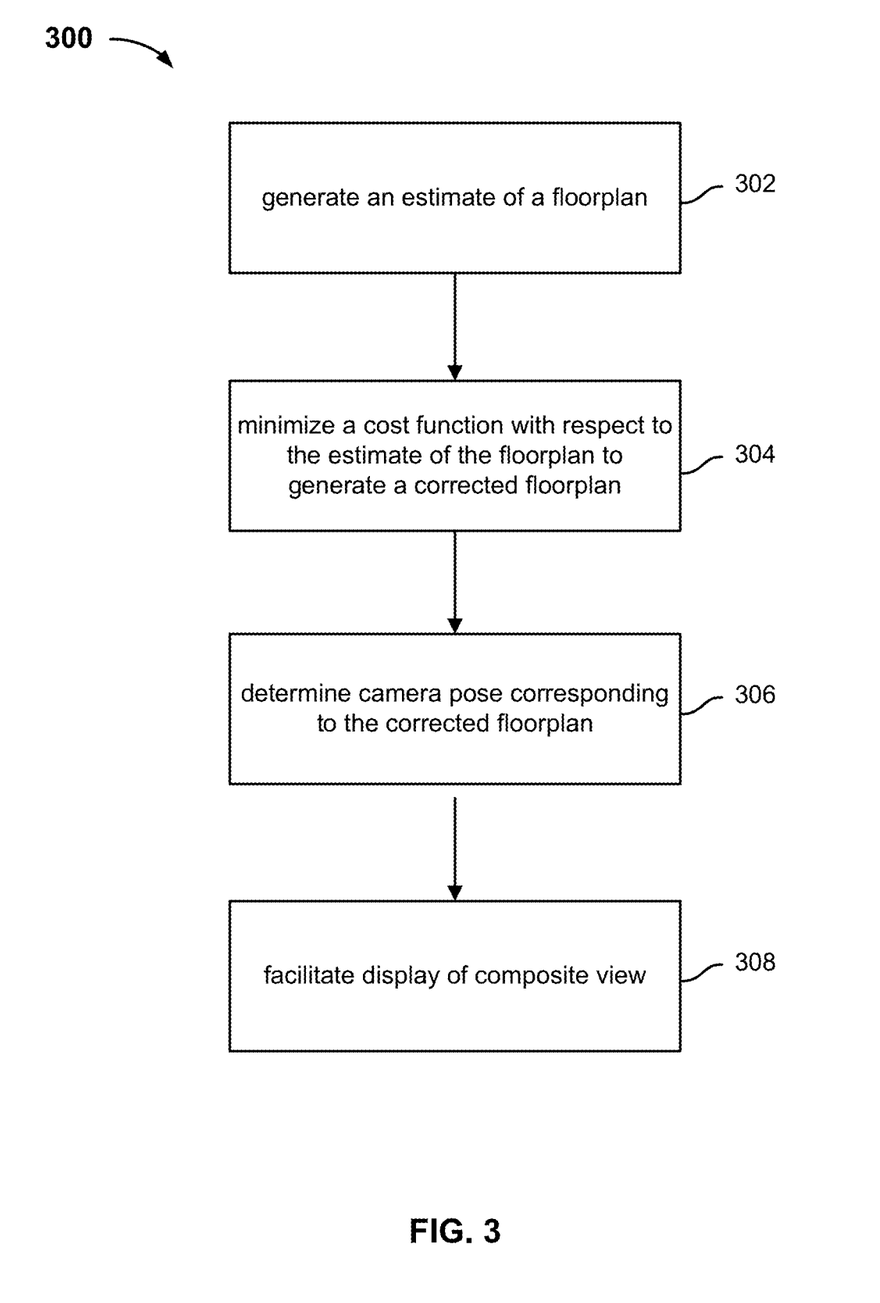
FIG. 3 is a high level flow chart illustrating an embodiment of a process for facilitating generation of a substantially perfectly aligned composite view comprising combined rendered and actual camera views.

FIG. 3 is a high level flow chart illustrating an embodiment of a process 300 for facilitating generation of a substantially perfectly aligned composite view comprising combined rendered and actual camera views. For example, process 300 may be employed with respect to an augmented reality application. At step 302, an estimate of a floorplan of a three-dimensional space is generated based on one or more views of the three-dimensional space from a camera of a device located in the three-dimensional space. For example, the estimate of the floorplan may be generated using process 100 of FIG. 1A. At step 304, a cost function is minimized with respect to the estimate of the floorplan generated at step 302 to generate a corrected or revised floorplan having less error than the estimated floorplan. For example, the cost function may comprise the cost function of Equation 1. At step 306, a pose of the camera corresponding to the corrected floorplan is determined. At step 308, a rendering having the determined camera pose is displayed in an actual field of view of the camera, resulting in a composite, augmented reality view.

As described, the disclosed techniques constrain three-dimensional spaces to spaces comprising floorplans and facilitate the determination of more accurate estimates of camera pose, which is especially useful in real time augmented reality applications. The disclosed techniques are not limited to augmented reality applications but generally may be employed with respect to a variety of other applications. For example, substantially perfect alignment allows the use of camera images for extracting consistent textures for three-dimensional model rendering.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving user input from a user comprising one or more lines specifying where one or more walls of a three-dimensional space meet a floor of the three-dimensional space;
generating an estimate of a floorplan of the three-dimensional space based on the received user input and one or more views of the three-dimensional space from a camera of a client device of the user located in the three-dimensional space;
minimizing a cost function with respect to the estimate of the floorplan to generate a corrected floorplan having less error than the estimated floorplan;
determining a pose of the camera with respect to the corrected floorplan; and
facilitating display of a rendering provided by a server that has the determined camera pose in an actual view of the camera of the client device of the user.

2. The method of claim 1, wherein facilitating display of the rendering in the actual view comprises facilitating real time display of the rendering in the actual view.

3. The method of claim 1, wherein the rendering and the actual view are aligned.

4. The method of claim 1, wherein the rendering and the actual view comprise a composite view.

5. The method of claim 1, wherein the rendering and the actual view comprise an augmented reality view.

6. The method of claim 1, wherein the rendering is displayed on top of the actual view.

7. The method of claim 1, wherein the rendering is overlaid on the actual view.

8. The method of claim 1, wherein the rendering is superimposed on the actual view.

9. The method of claim 1, wherein the cost function includes a set of one or more constraints that are based on foreknowledge of floorplan properties.

10. The method of claim 1, wherein the cost function includes a set of one or more constraints that are based on foreknowledge of floorplan geometries.

11. The method of claim 1, wherein the cost function includes a set of one or more constraints that are based on a known floorplan specification of the three-dimensional space.

12. The method of claim 1, wherein the cost function comprises a constraint that floorplan walls meet at right angles.

13. The method of claim 1, wherein the cost function comprises an error function.

14. The method of claim 1, wherein the three-dimensional space comprises an enclosed, indoor space.

15. The method of claim 1, wherein the three-dimensional space comprises a room.

16. The method of claim 1, wherein the three-dimensional space comprises a building.

17. The method of claim 1, wherein the one or more lines are drawn by the user on a display of the client device displaying the actual view of the camera.

18. The method of claim 1, further comprising extracting textures from camera images for three-dimensional model rendering.

19. A system, comprising:
a processor configured to:
receive user input from a user comprising one or more lines specifying where one or more walls of a three-dimensional space meet a floor of the three-dimensional space;
generate an estimate of a floorplan of the three-dimensional space based on the received user input and one or more views of the three-dimensional space from a camera of a client device of the user located in the three-dimensional space;
minimize a cost function with respect to the estimate of the floorplan to generate a corrected floorplan having less error than the estimated floorplan;
determine a pose of the camera with respect to the corrected floorplan; and
facilitate display of a rendering provided by a server that has the determined camera pose in an actual view of the camera of the client device of the user; and
a memory coupled to the processor and configured to provide the processor with instructions.

20. The system of claim 19, wherein to facilitate display of the rendering in the actual view comprises to facilitate real time display of the rendering in the actual view.

21. The system of claim 19, wherein the rendering and the actual view are aligned.

22. The system of claim 19, wherein the rendering and the actual view comprise a composite view.

23. The system of claim 19, wherein the rendering and the actual view comprise an augmented reality view.

24. The system of claim 19, wherein the rendering is displayed on top of the actual view.

25. The system of claim 19, wherein the rendering is overlaid on the actual view.

26. The system of claim 19, wherein the rendering is superimposed on the actual view.

27. The system of claim 19, wherein the cost function includes a set of one or more constraints that are based on foreknowledge of floorplan properties.

28. The system of claim 19, wherein the cost function includes a set of one or more constraints that are based on foreknowledge of floorplan geometries.

29. The system of claim 19, wherein the cost function includes a set of one or more constraints that are based on a known floorplan specification of the three-dimensional space.

30. The system of claim 19, wherein the cost function comprises a constraint that floorplan walls meet at right angles.

31. The system of claim 19, wherein the cost function comprises an error function.

32. The system of claim 19, wherein the three-dimensional space comprises an enclosed, indoor space.

33. The system of claim 19, wherein the three-dimensional space comprises a room.

34. The system of claim 19, wherein the three-dimensional space comprises a building.

35. The system of claim 19, wherein the one or more lines are drawn by the user on a display of the client device displaying the actual view of the camera.

36. The system of claim 19, wherein the processor is further configured to extract textures from camera images for three-dimensional model rendering.

37. A computer program product, the computer program product being embodied in a non-transitory computer readable storage medium and comprising computer instructions for:
- receiving user input from a user comprising one or more lines specifying where one or more walls of a three-dimensional space meet a floor of the three-dimensional space;
- generating an estimate of a floorplan of the three-dimensional space based on the received user input and one or more views of the three-dimensional space from a camera of a client device of the user located in the three-dimensional space;
- minimizing a cost function with respect to the estimate of the floorplan to generate a corrected floorplan having less error than the estimated floorplan;
- determining a pose of the camera with respect to the corrected floorplan; and
- facilitating display of a rendering provided by a server that has the determined camera pose in an actual view of the camera of the client device of the user.

38. The computer program product of claim 37, wherein facilitating display of the rendering in the actual view comprises facilitating real time display of the rendering in the actual view.

39. The computer program product of claim 37, wherein the rendering and the actual view are aligned.

40. The computer program product of claim 37, wherein the rendering and the actual view comprise a composite view.

41. The computer program product of claim 37, wherein the rendering and the actual view comprise an augmented reality view.

42. The computer program product of claim 37, wherein the rendering is displayed on top of the actual view.

43. The computer program product of claim 37, wherein the rendering is overlaid on the actual view.

44. The computer program product of claim 37, wherein the rendering is superimposed on the actual view.

45. The computer program product of claim 37, wherein the cost function includes a set of one or more constraints that are based on foreknowledge of floorplan properties.

46. The computer program product of claim 37, wherein the cost function includes a set of one or more constraints that are based on foreknowledge of floorplan geometries.

47. The computer program product of claim 37, wherein the cost function includes a set of one or more constraints that are based on a known floorplan specification of the three-dimensional space.

48. The computer program product of claim 37, wherein the cost function comprises a constraint that floorplan walls meet at right angles.

49. The computer program product of claim 37, wherein the cost function comprises an error function.

50. The computer program product of claim 37, wherein the three-dimensional space comprises an enclosed, indoor space.

51. The computer program product of claim 37, wherein the three-dimensional space comprises a room.

52. The computer program product of claim 37, wherein the three-dimensional space comprises a building.

53. The computer program product of claim 37, wherein the one or more lines are drawn by the user on a display of the client device displaying the actual view of the camera.

54. The computer program product of claim 37, further comprising computer instructions for extracting textures from camera images for three-dimensional model rendering.

* * * * *